May 13, 1969  W. A. ROBERTS  3,443,604
PICKER STICK CHECK
Filed Feb. 23, 1968

INVENTOR
WILLIAM A. ROBERTS

BY B. P. Fishburn Jr.
ATTORNEY

United States Patent Office 3,443,604
Patented May 13, 1969

3,443,604
PICKER STICK CHECK
William A. Roberts, Paterson, N.J., assignor to Roberts Unique Loom Parts Inc., Paterson, N.J., a corporation of New Jersey
Filed Feb. 23, 1968, Ser. No. 707,797
Int. Cl. D03d 49/40
U.S. Cl. 139—162
10 Claims

ABSTRACT OF THE DISCLOSURE

A check which is embodied in a highly compact self-contained unit which mounts bodily on the end portion of the lay through a single mounting plate. A pivoted checking arm carries one way active clutching means which frictionally drive a cylindrical drum in one direction when the picker stick causes pivoting of the arm. The turning of the drum is resisted frictionally by an external adjustable brakeband having rigid components. The checking arm is spring-biased to an adjustable inactive position upon completion of the checking operation.

Background of the invention

The prior art contains quite a large number of teachings for picker stick checks, as is well known. While a number of these checks have proven satisfactory in varying degrees, most have suffered from complexity of construction or excessive manufacturing costs. Some checks of a more economical and simplified nature have proven impractical over long periods of usage and incapable of withstanding the pounding to which the mechanisms are subjected by the picker stick. As yet, no picker stick check has proven to be entirely satisfactory from all practical and economic standpoints and the aim of this invention is to provide a picker stick check which is an improvement over all known prior art types, both as to construction and economy.

The invention picker stick check is characterized by simplicity and extreme ruggedness, and by the fact that it is embodied in a highly compact unit which may be mounted upon the lay of the loom without difficulty. The check, once properly installed and adjusted, requires very little attention and maintenance and the very minimum number of moving parts are involved in the mechanism. Furthermore, the invention mechanism has been found to operate in a highly efficient manner for checking the picker stick in accordance with certain requirements which are well known in the art.

Summary of the invention

The invention picker stick check comprises a single mounting plate which attaches directly to one side of the lay and upon which the entire checking mechanism is mounted. A central pivot element carried by the mounting plate supports a drum member rotatably and surrounding this drum member are the two sections of an external essentially rigid although adjustable brakeband which also has an anchorage to the mounting plate.

A checking arm or lever pivotally supported on the central pivot element carries one way active clutching elements which engage the interior of the drum to turn the drum in one direction against the holding action of the brakeband when the checking arm is driven by the picker stick. The arm carries a roller near its free end projecting into the path of movement of the picker stick. A spring means connected with the checking arm returns the same automatically to an inactive position after the checking operation is complete, and the one way active clutching elements do not resist this return movement of the checking arm.

Description of the preferred embodiment

Figure 1:
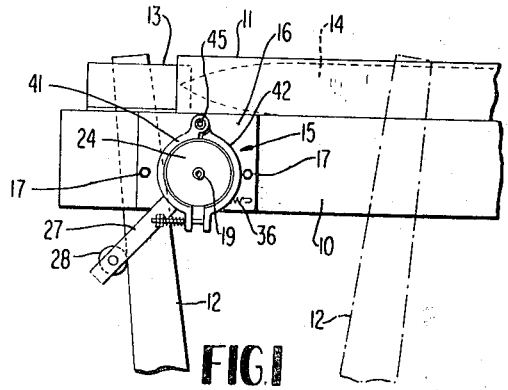
FIGURE 1 is a fragmentary side elevational view of a picker stick check embodying the invention, and showing a unit of the invention mounted upon one end portion of the lay of the loom.

Referring to the drawings wherein like numerals designate like parts, the numeral 10 designates a loom lay having a shuttle box 11 and being provided with a suitable slot to accommodate the movement of a picker stick 12 between the approximate positions shown in FIGURE 1 of the drawings. The top of the picker stick 12 carries the well known picker 13 to receive the impact of the shuttle 14 as the shuttle enters the box 11. The invention picker stick check is shown in its entirety at 15 in FIGURE 1 mounted upon one side of the lay 10 near one end of the lay. As is well known, the purpose of the picker stick check is to check the movement of the picker stick as the same is propelled outwardly toward the end of the lay due to the force of the shuttle impacting against the picker 13.

The picker stick check 15 comprises a single rigid mounting plate 16 which is secured detachably to the lay 10 by at least a pair of mounting bolts or screws 17. Secured centrally to the mounting plate 16 and projecting outwardly therefrom at right angles thereto is a main cylindrical pivot element or bolt 18 having an exterior head 19 and a reduced screw-threaded interior extension 20 received by a nut 21 which may be welded to the back of the mounting plate 16. Preferably a flat washer 22 is intervened between the mounting plate 16 and a shoulder 23 of the main pivot bolt 18.

Figure 3:
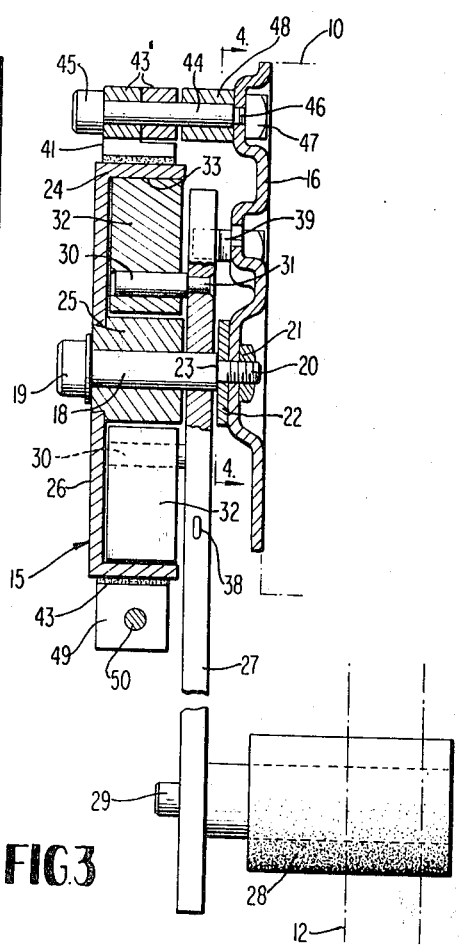
FIGURE 3 is a vertical section, partly in elevation, taken on line 3—3 of FIGURE 2.

A rigid cylindrical drum 24 having a swaged hub 25 is mounted rotatably upon the cylindrical pivot element 18 and is held thereon against outward axial displacement by the head 19. The drum 24 includes an outer wall 26, whereas the interior side of the drum is open, as shown in FIGURE 3. The cylindrical peripheral surface of the drum 24 constitutes a friction braking surface, as will be discussed, and the bore formed by the peripheral wall of the drum constitutes a second frictional surface to be engaged by one way active clutching elements soon to be described.

A rigid checking arm 27 extends radially of the pivot element 18 and is pivotally suspended from this element by means of an opening formed through the checking arm. As shown in the drawings, the checking arm 27 extends above and below the main pivot element 18. The lower end of the arm 27 extends substantially below the lay 10 and mounting plate 16 and carries at a suitable elevation a preferably hard rubber cylindrical checking roller 28 in the direct path of movement of the picker stick 12 and adapted to be struck by the picker stick during the outward movement thereof. The roller 28 preferably has a rigid core of wood or the like, and the roller is secured rigidly and removably to the checking arm 27 by a suitable fastener means 29.

Equidistantly on opposite sides of the central pivot element 18, the checking arm 27 carries right angular cylindrical hardened pivot pins 30 which are securely anchored to the checking arm 27 at 31. One way active generally radial friction clutching elements or dogs 32 are pivoted freely to the pins 30 and have rounded outer ends 33 adapted to frictionally engage the bore of the drum 24 with a tight wedging action so as to turn the drum in one direction only for an increment of rotation when the arm 27 is turned on its pivot by the picker stick 12. Whenever the arm 27 moves in the reverse direction, the one way active elements 32 are inactive and simply slide over the bore of the drum 24 and do not impart any reverse rotational movement to the drum.

Figure 2:
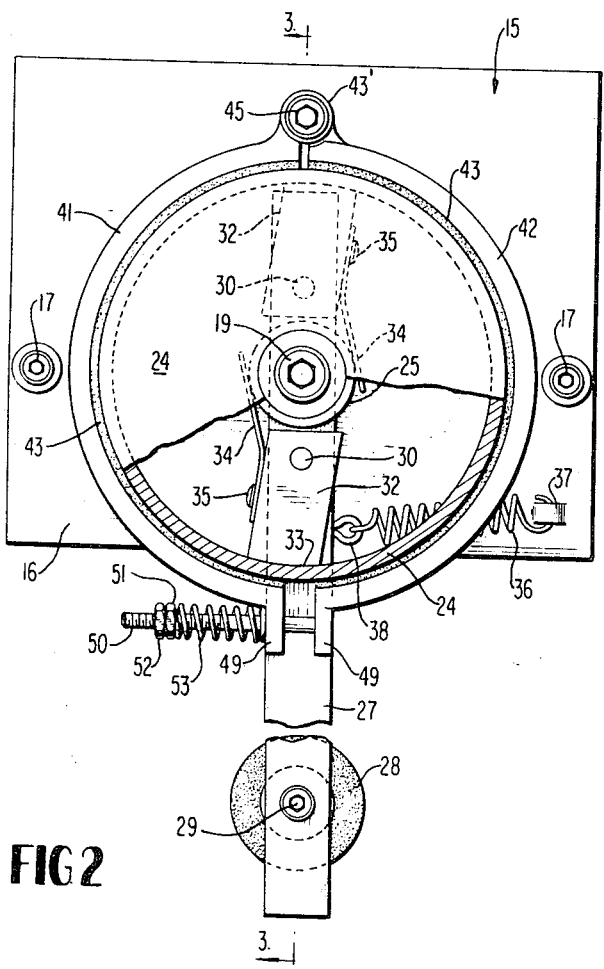
FIGURE 2 is an enlarged side elevation of the picker stick check, partly broken away and partly in section, and showing the checking arm in the inactive position.

As best shown in FIGURE 2, the one way active clutching elements 32 are resiliently biased into engagement with the drum 24 by a pair of leaf springs 34, one each secured at 35 to one of the clutching elements 32. The unattached portions of the springs 34 bear tangentially on opposite sides of the central hub 25. The checking arm 27 is resiliently biased toward its neutral or inactive position shown in FIGURE 2 by a retractile spring 36 having one end attached to the mounting plate 16 at 37 and its opposite end attached to the arm 27 as at 38. This spring 36 yields readily when the picker stick strikes the roller 28 so that the checking arm may swing toward a full checking position such as illustrated in FIGURE 1 of the drawings.

Figure 4:
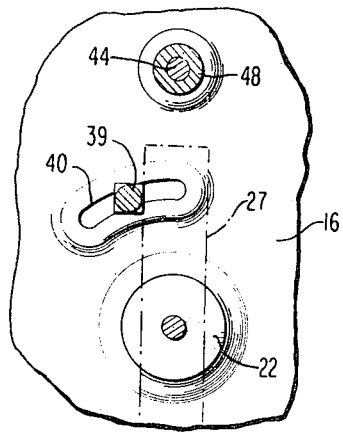
FIGURE 4 is a fragmentary enlarged vertical section taken on line 4—4 of FIGURE 3.

Referring to FIGURE 4, the checking arm 27 is arrested on its return movement by an adjustable positive stop element 39 mounted within an arcuate slot 40 formed in the mounting plate 16. By adjusting the position of the stop element 39 in the slot 14 and locking the stop element therein, the arm 27 can have its return travel accurately adjusted so that the roller 28 will meet the picker stick at precisely the desired point.

Surrounding the cylindrical drum 24 is a split or two section brakeband including approximately semi-circular rigid sections 41 and 42 having suitable friction linings 43 bonded or otherwise secured thereto. Corresponding ends of the rigid sections 41 and 42 are provided with interfitting knuckles 43' which are pivoted to a cylindrical bolt shank 44, which shank has a head 45 and a reduced diameter screw-threaded portion 46 engaging a nut 47 which may be welded to the mounting plate 16 as shown in FIGURE 3. A spacer element 48 is intervened between the mounting plate 16 and the nearest knuckle 43' to maintain the brake sections properly disposed with respect to the drum 24. The diametrically opposite end portions of the brake sections 41 and 42 carry radial extensions 49 which are apertured to receive an adjusting bolt 50 having adjusting and locking nuts 51 and 52 thereon. A compressible spring 53 interposed between the nut 51 and the adjacent extension 49 serves to maintain adjustable tension on the two friction brake sections 41 and 42 so that they will engage the drum 24 with the desirable pressure. This pressure may be adjusted over a fairly wide range by means of the nuts 51 and 52 to produce exactly the desirable checking action on the picker stick.

In light of the above detailed description, it is believed that the operation of the picker stick check may now be completely understood without any further explanation. Summarizing the operation, however, when the picker stick 12 is on its outward stroke, it will engage the roller 28 at the correct point determined by the position of the stop element 39, and this engagement will move the checking arm 27 toward the full checking position of FIGURE 1. During such outward movement of the arm 27, the clutching elements or dogs 32 will be active with the drum 24 and will turn the drum for a portion of a revolution against the frictional holding force of the external split brakeband. This checking movement may be regulated by adjusting the tension of the surrounding brakeband, as described.

When the picker stick as been fully checked, it will disengage the roller 28 and the spring 36 will return the arm 27 automatically into contact with the stop element 39 and this will determine the final inactive or neutral position of the arm 27 as shown in FIGURE 2. During such return movement of the arm 27, the clutching elements 32 are inactive and merely ride over the internal surface of the drum 24 without imparting any rotation to the drum. Thus, the drum 24 is turned step-by-step in one direction only whenever the picker stick 12 actuates the checking arm 27 by contact with the roller 28. The checking operation is smooth, efficient and develops the minimum of heat. Only two essential adjustments have been provided for in the mechanism and the check is very easy to install and service and is extremely durable and long-lasting. The numerous advantages of the invention over the prior art should now be apparent to those skilled in the art without the necessity for any further description herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A picker stick check comprising a mounting member attachable to the lay of a loom, a main pivot element on the mounting member, a rotary friction drum on the main pivot element, a checking arm pivoted to the main pivot element and including a part in the path of movement of the picker stick, one way active clutching means connected with the checking arm and engageable with said drum when the checking arm is moved in one direction by the picker stick to turn the drum for an increment of rotation in one direction, and an adjustable friction braking means for the drum secured to the mounting member and resisting turning of the drum by said one way active clutching means.

2. A picker stick check as defined by claim 1, and resilient means connected to the checking arm and returning the arm automatically to an inactive position after completion of the picker stick checking operation.

3. A picker stick check as defined by claim 2, and an adjustable positive stop element on the mounting member in the return path of movement of the checking arm and establishing a precise inactive position of the arm.

4. A picker stick check as defined by claim 1, wherein the mounting member is a plate attachable to one vertical side of the lay and the main pivot element is a pin element projecting beyond one side of the plate substantially at right angles thereto, the rotary friction drum having a hub rotatable upon the pin element and having external and internal friction faces, said one way active clutching means engaging the internal face of the drum and said braking means engaging the external face of the drum.

5. A picker stick check as defined by claim 4, wherein said clutching means comprises at least one clutch element pivoted to the checking arm on one side of the main pivot element and having a face which frictionally engages the internal face of the drum to drive the drum when the arm swings in one direction, said clutch element being inactive and sliding over said internal face without driving the drum when said checking arm swings in an opposite direction.

6. A picker stick check as defined by claim 5, and a spring element connected with the clutch element and biasing it into frictional contact with the internal face of the drum.

7. A picker stick check as defined by claim 4, wherein said clutching means is a diametrically opposed pair of clutch elements pivoted to the checking arm on opposite sides of said hub, and a leaf spring secured to one side of each clutch element and bearing tangentially against the side of the hub.

8. A picker stick check as defined by claim 1, and wherein said braking means comprises an external brakeband device surrounding said drum and frictionally engaging the periphery thereof with an adjustable tension.

9. A picker stick check as defined by claim 8, wherein the brakeband device consists of a pair of substantially semicircular brakeband sections having corresponding ends pivoted to said mounting member, and resilient adjusting means interconnecting the other corresponding ends of the brakeband sections.

10. A picker stick check as defined by claim 4, and wherein the friction braking means comprises a pair of surrounding substantially rigid brake members having corresponding ends pivoted to said plate and adapted to frictionally contact the external face of the drum, and resilient means interconnecting said surrounding brake members to regulate the pressure thereof against the drum.

References Cited

UNITED STATES PATENTS

| | | | |
|---|---|---|---|
| 1,279,314 | 9/1918 | Flowers et al. | 139—162 |
| 1,513,044 | 10/1924 | Jones et al. | 139—162 |
| 2,452,955 | 11/1948 | Pressley | 139—162 |
| 2,956,590 | 10/1960 | Pressley | 139—162 |

JAMES KEE CHI, *Primary Examiner.*